Patented Oct. 20, 1953

2,656,373

UNITED STATES PATENT OFFICE 2,656,373

PROCESS FOR PRODUCING MIXED DIARYL ESTERS OF ORTHO-PHOSPHORIC ACID

Harry R. Gamrath, St. Louis, Mo., assignor to Monsanto Chemical Company, St. Louis, Mo., a corporation of Delaware No Drawing. Application April 14, 1950, Serial No. 156,035

20 Claims. (Cl. 260—461)

This invention relates to esters of ortho-phosphoric acid; more specifically, this invention relates to an improved process for the preparation of certain esters of ortho-phosphoric acid having the following general formula

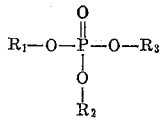

wherein $R_1$ represents an aliphatic radical and $R_2$ and $R_3$ represent dissimilar aryl radicals. The aliphatic radical in the compounds embraced by the above described general formula may be acyclic or alicyclic, saturated or unsaturated, substituted or unsubstituted. Thus, the aliphatic radical may contain one or more of the following illustrative, but not limitative, substituents: halogens, such as chlorine, bromine, iodine and fluorine; nitro groups; alkoxy groups, such as methoxy, ethoxy, propoxy, isopropoxy, butoxy, etc.; aryl groups, such as phenyl and naphthyl and substituted phenyl and substituted naphthyl, etc. The number of carbon atoms in the aliphatic radical may be varied over a wide range, as for example, from 1 to 24 carbon atoms. The dissimilar aryl radicals, such as the phenyl and naphthyl radicals, in the compounds embraced by the above described general formula and included within the scope of this invention, may be unsubstituted or mono or poly substituted. Thus, the aryl radical may contain one or more of the following illustrative, but not limitative, substituent radicals in one or more positions on the ring: alkyl radicals, such as methyl, ethyl, propyl, isopropyl, butyl, isobutyl, pentyl, etc.; halogens, such as chlorine, bromine, iodine and fluorine; nitro groups; alkoxy groups, such as methoxy, ethoxy, propoxy, isopropoxy, butoxy, etc.

The phosphate esters prepared by the novel process of this invention are generally nearly colorless liquids having mild, pleasant odors. These new esters have exceptional utility as flexibilizing plasticizers for polyvinyl chloride compositions, imparting to the compositions the properties of flexibility at freezing temperatures, low volatility loss of plasticizer at higher temperatures and non-inflammability. Such polyvinyl chloride compositions are in part disclosed and claimed in my copending application Serial No. 752,830, filed June 5, 1947, while certain of these phosphate esters are disclosed and claimed as compounds, per se, in my copending application Serial No. 23,133, filed April 24, 1948. Because of their low pour points and very high autogeneous ignition temperatures and compatibility with paraffinic hydrocarbon oils, these phosphate esters may be combined with paraffinic hydrocarbon oils to prepare hydraulic and torque converter fluids of highly desirable characteristics. Moreover, these esters have a wide variety of other uses, such as film-forming addition agents for extreme pressure lubricants and as the liquid medium for filters for air conditioning systems. Moreover, certain of these esters have a wide variety of other uses, such as lubricants for mechanisms from delicate clock works to extreme pressure bearing surfaces.

In all of the above mentioned uses of the phosphate esters prepared by the novel process of this invention, it is to be emphasized that exceptional purity is required. For example, in their use as plasticizers for polyvinyl chloride, excessive quantities of the dialkyl derivatives decrease the permanence of the plasticizer in the plasticized composition. Excessive quantities of the triaryl derivative in such applications cause a decrease in the flexibility characteristics of the plasticized compositions. Moreover, such impurities cause substantial changes in the autogeneous ignition temperatures of these phosphate esters and also substantial changes in the viscosity of these esters, thereby seriously affecting their utility as hydraulic and torque converter fluids.

It is an object of this invention to provide an improved process for the production of certain ortho-phosphoric acid esters. It is a further object of this invention to provide an improved commercially feasible process for the production of certain ortho-phosphoric acid esters characterized by an exceptional degree of purity. Moreover, it is another object of this invention to provide an improved commercially feasible process for the production of certain ortho-phosphoric acid esters wherein the simple reactions of the process produce esters of such a high degree of purity that further purification by fractionation of the ester is unnecessary. Still further objects will become apparent from a description of the novel process of this invention.

Heretofore, based on the prior art for preparing phosphate esters, the preparation of the phosphate esters of this invention would be attempted through a multiple step procedure. According to such a procedure, in excess of one mol of phenol would be reacted with one mol of phosphorus oxychloride. The resulting mass would then be fractionated to separate the monophenyl phosphoryl dichloride from the diphenyl phosphoryl chloride and neutral triphenyl phosphate ester which also formed in the reaction. The isolated monophenyl phosphoryl dichloride would then be reacted with a slight excess of another phenol. After the reaction was complete, the mass would again be fractionated to separate the diaryl phosphoryl monochloride from the neutral phosphate esters which also formed. The diaryl phosphoryl monochloride containing dissimilar aryl groups and isolated from such a reaction, would be obtained in a very low yield due to the competing additional reactions. To complete the operations, the diaryl phosphoryl monochloride would then be reacted with an aliphatic alcohol, usually in an inert medium, such as benzene, to yield the alkyl diaryl phosphate containing dissimilar aryl groups. Based on $POCl_3$ charged, the yield of alkyl di(mixed aryl) phosphate would be extremely low.

Contrary to what would have been expected or predicted, it has now been found that if a 1 molecular proportion of a phosphoryl dichloride having the formula

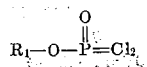

wherein $R_1$ is an aliphatic radical, is reacted with a mixture containing approximately a 1 molecular proportion each of the alkali metal or alkaline earth metal salts of two dissimilar phenols in an aqueous medium, there is produced a substantial yield of a compound having the formula

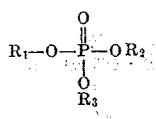

wherein $R_1$ is an aliphatic radical and $R_2$ and $R_3$ are dissimilar aryl radicals. This resultant phosphate ester thus formed in high yields may be recovered from the aqueous reaction mixture, washed with water and dilute alkali and dehydrated under vacuum. The ester thus obtained is of such a degree of purity that further purification by fractionation is unnecessary.

Infra red absorption spectra analysis of the phosphate esters prepared as described above shows that the esters are made up of predominantly the alkyl di(mixed aryl) phosphates. On the basis of the art heretofore known, it would have been predicted that the ester mass resulting from the reaction of 1 mol of alkyl phosphoryl dichloride in the presence of 1 mol of an alkali metal or alkaline earth metal arylate (I) and 1 mol of an alkali metal or alkaline earth metal arylate (II), would be a mixture containing the three esters, alkyl di(aryl I) phosphate, alkyl di(aryl II) phosphate and alkyl di(aryl I, aryl II) phosphate. If the reactivities of the two arylates were essentially the same, the prediction would be that the ester mass would contain about one-third mol of each of the phosphate esters. It has been found, however, that according to the novel process of this invention, the ester obtained consists of substantially pure alkyl di(aryl I, aryl II) phosphate.

The following examples are illustrative of the novel process of this invention:

EXAMPLE I

*2-ethylhexyl phenyl para-cresyl phosphate*

For the production of 100 pounds of 2-ethylhexyl phenyl p-cresyl phosphate, 44.5 pounds of phosphorus oxychloride were cooled to 15° C. in a closed enameled reactor. Thirty-eight pounds of 2-ethylhexanol which had been cooled to approximately 15° C. were added to the $POCl_3$ with continuous stirring and at such a rate so as to maintain a reaction-mass temperature of 10–15° C. After the addition of the 2-ethylhexanol was complete, the agitation was continued and the reaction temperature allowed to rise to 25° C. The reaction-mass temperature was maintained at 25° C. and the agitation continued for at least one hour during which time a vacuum was gradually applied to the reaction vessel, to remove the hydrogen chloride which was evolved, until an absolute pressure of 50 millimeters of mercury was reached. The reaction vessel now contained octyl phosphoryl dichloride and was ready for use in the next step which is a Schotten-Baumann reaction with the sodium arylates.

The sodium arylates were prepared by charging an iron kettle with 81.4 pounds of water, 28.6 pounds of phenol, 32.9 pounds of p-cresol and 49 pounds of 50% sodium hydroxide in a manner and at such a rate as to maintain a solution temperature below 25° C.

The crude 2-ethylhexyl phenyl p-cresyl phosphate was produced by charging the 2-ethylhexyl phosphoryl dichloride to the above prepared aqueous solution of sodium p-cresylate and sodium phenate at such a rate as to maintain a reaction temperature below 3° C. After the addition of the octyl phosphoryl dichloride was complete, the stirring was continued and the temperature allowed to rise to 20° C. The agitation was then stopped and the mixture allowed to stand until an ester layer and an aqueous salt layer formed and the crude ester was thereupon drawn off.

Purification was effected by washing the ester with dilute aqueous sodium hydroxide until the phenolic bodies and partial esters were removed. If desired, the ester may be further purified and refined by a choice of a variety of techniques well known to those familiar with the art of refining phosphate esters. The yield of 2-ethylhexyl phenyl p-cresyl phosphate from the above process, based on the $POCl_3$ charged, was 92%.

The refined 2-ethylhexyl phenyl p-cresyl phosphate prepared in the above manner had the following properties:

Sp. gr. 25°/25° C. _____ 1.0785
Ref. index 25° C. _____ 1.5082
Color _____ Nearly water white 100-pound quantities of 2-ethylhexyl phenyl o-cresyl phosphate or 2-ethylhexyl phenyl m-cresyl phosphate may be prepared by using the exact procedure of the above example by substituting 32.9 pounds of o-cresol or 32.9 pounds of m-cresol for the 32.9 pounds of p-cresol which was used in the above example.

Moreover, in practice, it will be expedient to prepare monoalkyl phenyl cresyl phosphates by using a mixture of isomeric cresols such as are commonly encountered in "commercial cresol." By "commercial cresol" is meant the article of commerce designated "commercial cresol" and including such compositions as are described by Field, Dempster and Tilson, Ind. Eng. Chem. 32, 489, 495 (1940).

The final product, when "commercial cresol" is used as the source of the cresyl substituent, will be a mixture of monoalkyl phenyl o-cresyl phosphate, monoalkyl phenyl m-cresyl phosphate, monoalkyl phenyl p-cresyl phosphate and, in addition, monoalkyl phenyl xylyl phosphates, as "commercial cresol" normally contains a percentage of isomeric xylols.

EXAMPLE II

*2-ethylhexyl phenyl cresyl phosphate (using "commercial cresol" as the source of the cresyl substituent)*

A 100-pound quantity of 2-ethylhexyl phenyl cresyl phosphate was prepared in the exact manner described in the foregoing example for the preparation of 100 pounds of 2-ethylhexyl phenyl p-cresyl phosphate, with the exception that 32.9 pounds of a "commercial cresol" having the approximate analysis:

| | Per cent |
|---|---|
| Ortho cresol | 2 |
| Meta cresol | 45 |
| Para cresol and xylenols | 53 | was substituted for the 32.9 of p-cresol in the preparation of the sodium cresylate solution. The yield of 2-ethylhexyl phenyl cresyl phosphate esters, based on $POCl_3$, was 91%.

The 2-ethylhexyl phenyl cresyl phosphates prepared by using the above "commercial cresol" as the source of the cresyl substitutent had the following properties:

| | |
|---|---|
| Sp. gr. 25°/25° C | 1.0749 |
| Ref. index 25° C | 1.5080 |
| Color | Nearly water white |

EXAMPLE III

*Lauryl phenyl cresyl phosphate*

115.1 g. of $POCl_3$ were cooled with stirring to about 20° C. in a closed glass reaction vessel. 139.5 g. of lauryl alcohol was cooled to approximately 25° C. and added to the $POCl_3$ with continuous stirring and at a rate so as to maintain a reaction temperature of 20° C. The reaction mixture was agitated and the temperature slowly raised to 30-40° C. and maintained at that temperature for one hour following the addition of all the lauryl alcohol; thereafter, the temperature was raised to approximately 50° C. and the stirring continued for another hour. The hydrogen chloride gas which was evolved from the reaction was continuously removed by means of applying a vacuum to the reaction vessel.

The reaction vessel now contained lauryl phosphoryl dichloride and was ready for use in the next step which is a Schotten-Baumann reaction with the sodium arylates.

The sodium arylates were prepared by reacting 74 g. of phenol, 85 g. of cresol with 63 g. of NaOH dissolved in 265 cc. of $H_2O$ in such a manner and added at such a rate so as to maintain a solution temperature below 25° C. The solution of sodium phenate and sodium cresylate was cooled to 5° C. and the lauryl phosphoryl dichloride added to the solution of the sodium arylates at such a rate so as to maintain a reaction temperature below 5° C. After the addition of the lauryl phosphoryl dichloride was complete, the stirring was continued and the temperature allowed to rise to 20-25° C. The reaction mixture was then allowed to stand until an ester layer and an aqueous layer formed and the crude ester layer was separated from the aqueous layer by decantation.

Purification was effected by washing the ester with dilute aqueous sodium hydroxide until the phenolic bodies and partial esters were removed. If desired, the ester may be further purified and refined by a choice of a variety of technique well known to those familiar with the art of refining phosphate esters. The yield of lauryl phenyl cresyl phosphate, based on the phosphorus oxychloride charged, was 90%.

EXAMPLE IV

*n-Hexyl phenyl cresyl phosphate* n-Hexyl phosphoryl dichloride was prepared by adding 102.1 g. of n-hexanol, cooled to 10° C., to 153.4 g. of phosphorus oxychloride cooled to 10° C. with stirring and with cooling and at a rate so as to maintain a reaction temperature of 10-15° C. After all of the n-hexanol had been added to the reaction, the cooling means was removed and while the agitation was continued the reaction temperature was allowed to rise to room temperature. Thereafter the stirring was continued while the reaction was placed under vacuum (approximately 50 millimeters of mercury absolute) for 1½ hours to complete the reaction and to remove the hydrogen chloride gas which was evolved from the reaction. The product of the above reaction between n-hexanol and phosphorus oxychloride was n-hexyl phosphoryl dichloride.

The n-hexyl phosphoryl dichloride was reacted with an aqueous solution of sodium arylates cooled to 3° C. and prepared by adding 113.5 g. of cresol and 98.8 g. of phenol to 500 cc. of water having dissolved therein 180.7 g. of 46.5% sodium hydroxide solution, at such a rate so as to maintain a reaction temperature of 3° C. to 5° C. After all of the n-hexyl phosphoryl dichloride had been added to the solution of sodium arylates, the cooling means was removed and the reaction temperature allowed to rise to 22° C. Thereafter, the reaction was carried to completion by continuous agitation for 1½ hours. After the agitation was stopped, the reaction mixture separated into an ester layer and an aqueous layer, and the ester layer was then separated from the aqueous layer by decantation. The ester layer was given successive washes with 2% NaOH solution and water thereby removing any unreacted phenolic bodies and partial esters and reduced alkalinity of the mass until it is acid to phenolphthalein. The ester was then further refined in accordance with the usual methods well known to those skilled in the art of refining phosphate esters. The yield, based on phosphorus oxychloride, was 89.7%.

n-Hexyl phenyl cresyl phosphate prepared as just described had the following properties:

| | |
|---|---|
| Sp. gr. 25°/25° C | 1.110 |
| Ref. index 25° C | 1.5182 |
| Viscosity at 100° F | cs 11.3 |
| Viscosity at 210° F | cs 2.6 |

EXAMPLE V

*Trimethylhexyl phenyl cresyl phosphate*

460.2 g. of phosphorus oxychloride were cooled with stirring to a temperature of 5° C. to 10° C. in a glass-lined closed reaction vessel. 432.8 g. of 3,5,5-trimethylhexanol were cooled to 5° C. to 10° C. and were added to the phosphorus oxychloride with continuous stirring and at a rate so as to maintain a reaction-mass temperature of about 15° C. The reaction mixture was then agitated while the temperature of the reaction mixture was allowed to come up to room temperature; thereafter, the stirring was continued and the reaction mixture was placed under a vacuum (about 50 mm. of mercury absolute) over a period of two hours to remove the hydrogen chloride gas which was evolved from the reaction.

An aqueous solution of sodium arylates was prepared by adding 296.4 g. of phenol and 340.5 g. of cresol to 2500 cc. of water having dissolved therein 542.0 g. of 46.5% sodium hydroxide solution. The aqueous solution of sodium arylates was cooled to 0° C. and the nonyl phosphoryl dichloride, as above prepared by the reaction of the trimethyl substituted primary hexanol and the phosphorus oxychloride, was added to the aqueous solution of sodium arylates at such a rate so as to maintain a reaction temperature below 5° C. After all of the nonyl phosphoryl dichloride had been added to the aqueous solution of sodium arylates, the reaction mixture was agitated for a period of three hours and allowed to warm up to room temperature. When the agitation was stopped, the reaction mixture separated into an ester layer and an aqueous layer and the ester layer was then separated from the aqueous layer by decantation. The ester layer was given successive washes with 2% NaOH solution thereby removing the unreacted phenolic bodies and partial esters and reducing the alkalinity of the mass until it was acid to phenolphthalein. The ester was then further refined in accordance with the usual methods well known to those who are skilled in the art of refining phosphate esters. The yield, based on phosphorus oxychloride, was 90.5%.

EXAMPLE VI

Butoxyethyl phenyl cresyl phosphate 153.4 g. of phosphorus oxychloride were cooled with stirring to about 15° C. in a glass-lined closed reaction vessel. 118.1 g. of ethylene glycol mono-butyl ether were cooled and added, with stirring, to the phosphorus oxychloride over a period of one hour so as to maintain a reaction temperature of about 16° C. The stirring was continued for 1.5 hours after the ethylene glycol monobutyl ether had been added, the temperature being maintained at 15° C. to 20° C. and the reaction vessel being held under a vacuum of about 50 mm. of mercury absolute to remove the hydrogen chloride gas which was evolved from the reaction. The reaction mass was substantially butoxyethyl phosphoryl dichloride.

The butoxyethyl phosphoryl dichloride was added to a cooled aqueous solution consisting of 117.5 g. of sodium phenate, 136.5 g. of sodium cresylate and 650 cc. of water, over a period of 2½ hours while maintaining a reaction temperature of 0° C. to 3° C. Thereafter, the temperature was allowed to rise to 20° C. and the stirring continued for an additional two hours. The reaction mixture was then allowed to stand until an ester layer and an aqueous layer formed and the ester layer then decanted from the water layer. The crude ester was given successive washes with 2% NaOH solution and water to remove the unreacted phenolic bodies and partial esters and thereafter refined in accordance with the usual methods known to those skilled in the art of refining phosphate esters. The yield, based on phosphorus oxychloride, was 89.1%.

EXAMPLE VII

2-methylpentoxyethyl phenyl cresyl phosphate 153.4 g. of phosprous oxychloride were cooled with stirring to about 10° C. in a glass-lined closed reaction vessel. 146 g. of ethylene glycol mono-2-methylpentyl ether were cooled to approximately 15° C. and added to the phosphorus oxychloride with continuous stirring and at a rate so as to maintain a reaction temperature of 20° C. The reaction mixture was agitated and the reaction temperature of 20° C. maintained for one hour following the addition of all the ethylene glycol mono-2-methylphentyl ether; thereafter the temperature was allowed to rise to approximately 25° C. and the stirring continued for another hour. The hydrogen chloride gas which was evolved from the reaction was continuously removed by means of applying a vacuum to the reaction vessel.

After the reaction between the ethylene glycol mono-2-methylphentyl ether and the phosphorus oxychloride and the removal of the hydrogen chloride had been completed, the reaction mixture containing 2-methylpentoxyethyl phosphoryl dichloride was slowly added to a reactor containing an aqueous solution, cooled to about 0° C., the aqueous solution containing 117.5 g. of sodium phenate and 136.5 g. of sodium cresylate. During the addition of the 2-methylpentoxyethyl phosphoryl dichloride, the temperature was maintained below 5° C. After the 2-methylpentoxyethyl phosphoryl dichloride had been completely added to the aqueous mixture of sodium arylates, with continuous stirring, the temperature was allowed to gradually rise to 25° C.

Upon stopping the agitation, the reaction mixture soon separated into an aqueous layer and a crude ester layer. The aqueous layer was drawn off and discarded, and the ester purified by washing with dilute aqueous NaOH until the phenolic bodies and partial esters were removed. The ester may be further purified and refined by a choice of a variety of techniques well known to those familiar with the production of phosphate esters.

The yield of 2-methylpentoxyethyl phenyl cresyl phosphate based on phosphorus oxychloride, was about 80%.

EXAMPLE VIII

2-ethylhexoxyethyl phenyl cresyl phosphate

Using the method of Example VII, 174 g. of ethylene glycol mono-2-ethylhexyl ether were substituted for the 146 g. of ethylene glycol mono-2-methylpentyl ether. 2-ethylhexoxyethyl phenyl cresyl phosphate was obtained in a yield of 90%, based on phosphorus oxychloride, and had the following properties:

Sp. gr. 25°/25° C _____ 1.0795
Ref. index 25° C _____ 1.5020

EXAMPLE IX

2-ethylhexoxyethyl cresyl o-chlorophenyl phosphate

Using the method as described in Example VII, 2-ethylhexoxyethyl cresyl o-chlorophenyl phosphate was made from the following ingredients:

Phosphorus oxychloride _____ g__ 153.4
Ethylene glycol mono-2-ethylhexyl ether _____ g__ 174.0
Cresol _____ g__ 113.5
o-Chlorophenol (assay 95.6%) _____ g__ 142.2
Sodium hydroxide (assay 49.8%) _____ g__ 168.6
Water _____ cc__ 280

From these charges of starting materials, 403.7 g. of phosphate ester were obtained, representing a yield of 88.8% on phosphorus oxychloride. Physical properties of this ester were:

Sp. gr. 25°/25° C _____ 1.1415
Ref. index 25° C _____ 1.5100

EXAMPLE X n-Decoxyethyl phenyl cresyl phosphate

To 200 g. of phosphorus oxychloride, cooled to about 20° C. in a closed and continuously cooled reactor, 264.5 g. of ethylene glycol monodecyl ether were added with stirring and at a rate so as to maintain a reaction temperature of about 20° C. After all of the ethylene glycol monodecyl ether had been added to the phosphorus oxychloride, the reaction mixture was agitated and the temperature slowly raised to and maintained at 25° C. to 30° C. for about one hour. Thereafter the temperature was raised to 40° C. and maintained at that temperature for an additional hour while the stirring was continued and a vacuum of 25 mm. of mercury absolute was applied to the reactor to remove the hydrogen chloride formed during the reaction. The product of this reaction was decoxyethyl phosphoryl dichloride.

A solution of sodium arylates, containing 178.2 g. of sodium cresylate and 153 g. of sodium phenate dissolved in 850 cc. of water, was cooled to 5° C. and while the cooling of the aqueous solution of the sodium arylates was continued, the above prepared decoxyethyl phosphoryl dichloride was slowly added to the cooled solution of sodium arylates with stirring and at a rate so as to maintain a reaction temperature of about 5° C. Thereafter, the temperature was slowly raised to 30° C. and the stirring continued for another hour, at which time the reaction was finished with the formation of decoxyethyl phenyl cresyl phosphate. When the stirring of the reaction mixture was stopped, the mixture separated into an aqueous layer and the crude ester layer. It is often desirable to add additional sodium chloride to the reaction mixture to aid in the salting out of the ester, as the alkoxyethyl phenyl cresyl phosphates having the longer alkyl substituents often times do not have a sharp water and ester layer separation. After separation of the crude ester from the reaction mixture, the ester was given successive washes with 2% NaOH solution and water, thereby removing the unreacted phenolic bodies and partial esters, and reducing the alkalinity of the mass until it is acid to phenolphthalein.

The yield of n-decoxyethyl phenyl cresyl phosphate, based on phosphorus oxychloride, was 84%.

EXAMPLE XI

2-n-propylheptoxyethyl phenyl cresyl phosphate 76.7 g. of phosphorus oxychloride were cooled to 15° C. in a glass-lined closed reaction vessel, and with continuous cooling of the reactor, 101 g. of ethylene glycol mono-2-n-propylheptyl ether were added with stirring to the phosphorus oxychloride at a rate so as to maintain a reaction temperature of 15° C. to 20° C. After all of the ethylene glycol mono-2-n-propylheptyl ether had been added, the agitation was continued while the temperature was raised to about 25° C., at which time a vacuum of 25 millimeters of mercury (absolute pressure) was applied to the reactor and maintained for about two hours to remove the hydrogen chloride evolved and carry the reaction to completion to form 2-n-propylheptoxyethyl phosphoryl dichloride.

An aqueous solution of sodium arylates, prepared by adding 56.8 g. of cresol and 49.4 g. of phenol to an aqueous alkaline solution prepared by dissolving 89.6 g. of 46.5% soda lye in 300 cc. of water, was cooled to 0° C. and the 2-n-propylheptoxyethyl phosphoryl dichloride was added to the cooled solution of sodium arylates with stirring and at a rate so as to maintain a reaction temperature of about 5° C. Thereafter, the reaction was finished off by slowly raising the temperature to about 25° C. and stirring for 2½ to 3 hours. The finished ester was then recovered and purified in the manner described for the preparation of decoxyethyl phenyl cresyl phosphate.

The yield of 2-n-propylheptoxyethyl phenyl cresyl phosphate, based on phosphorus oxychloride, was 87.5%.

EXAMPLE XII

Tridecyl phenyl cresyl phosphate 120.1 g. of a 13 carbon branched chain alcohol prepared from the polymerization products of olefins were cooled to about 20° C. and added to about 92.0 g. of POCl₃ cooled to about 20° C. in a glass lined closed reaction vessel with continuous stirring and cooling so as to maintain a reaction temperature of about 20° C. The reaction mixture was agitated and the temperature slowly raised to 30°–40° C. and maintained at that temperature for one hour following the addition of all the tridecyl alcohol. The temperature was then raised to about 50° C. and the stirring continued for another hour. The hydrogen chloride gas which was evolved from the reaction was continuously removed by means of applying a vacuum to the reaction vessel.

158.9 g. of the above prepared tridecyl phosphoryl dichloride were transferred to a reactor containing an aqueous solution of potassium phenate and potassium cresylate, at a temperature below 15° C., prepared from 150 cc. of water, 49.4 g. of phenol, 56.7 g. of cresol and 117 g. of a 50% potassium hydroxide. The tridecyl phosphoryl dichloride was added to the sodium arylate solution at such a rate as to maintain a temperature between 11° and 14° C. After all the tridecyl phosphoryl dichloride had been added to the sodium arylate solution, the reaction was carried to completion. The reaction mixture was then allowed to stand until an ester layer and an aqueous layer formed and the ester layer was separated from the aqueous layer. The ester was given successive washes with a sodium hydroxide solution and water and then dehydrated under vacuum at about 100° C. An excellent yield of tridecyl phenyl cresyl phosphate was obtained.

EXAMPLE XIII

Octodecyl phenyl chloro-alpha-naphthyl phosphate

The octadecyl alcohol used in this example was 2 - (1,3,3 - trimethylbutyl) - 5,7,7 - trimethyl - 1-octanol prepared from the polymerization products of olefins.

76.7 g. of POCl₃ were cooled with stirring to about 25° C. in a glass-lined closed reaction vessel. 135.5 g. of the above described octadecyl alcohol were cooled and added to the POCl₃ at a rate so as to maintain a reaction temperature of about 25° C. The reaction mixture was continuously agitated and the temperature allowed to rise to room temperature, and maintained at this temperature for an additional one hour stirring period, during which time the hydrogen chloride gas evolved during the reaction was removed by means of applying a vacuum (below 30 mm. Hg absolute) to the reaction vessel.

The octadecyl phosphoryl dichloride was then transferred to a reactor containing an aqueous sodium arylate solution cooled to 25° C. and prepared by adding 49.4 g. of phenol and 93.8 g. of chloro-alpha-naphthol to 250 cc. of water having dissolved therein 90.5 g. of 46.5% sodium hydroxide. The octadecyl phosphoryl dichloride was added to the aqueous sodium arylate solution at such a rate as to maintain a temperature below 30° C. After all of the octadecyl phosphoryl dichloride was added, the reaction mixture was stirred for an additional three hours, allowing the mixture to come to room temperature. On standing, the reaction mixture separated into an aqueous layer and an ester layer. The ester layer was removed and given successive washes with 2% sodium hydroxide solution and water, and finally dehydrated under vacuum at about 110° C. The yield of octadecyl phenyl chloro-alpha-naphthyl phosphate was excellent.

EXAMPLE XIV

*n-Tetradecoxyethyl cresyl chlorocresyl phosphate*

153.4 g. of $POCl_3$ were cooled with stirring to about 10° C. in a glass-lined closed reaction vessel. 258 g. of ethylene glycol mono-n-tetradecyl ether were cooled to approximately 15° C. and added to the $POCl_3$ with continuous stirring and at a rate so as to maintain a reaction temperature of 20° C. The reaction mixture was agitated and the reaction temperature of 20° C. maintained for one hour following the addition of all the reactants. Thereafter, the temperature was allowed to rise to about 25° C. and the stirring continued for another hour. The hydrogen chloride gas which was evolved from the reaction mixture was continuously removed by means of applying a vacuum to the reaction vessel.

The tetradecoxyethyl phosphoryl dichloride was transferred to a reactor containing an aqueous solution, cooled to about 0° C., and made up of 153.4 g. potassium cresylate and 189.6 g. potassium chlorocresylate. After all of the reactant had been added to the aqueous potassium arylate solution, the reaction mixture was agitated for 1½ hours and then with continuous stirring, the temperature was gradually raised to 30° C. The reaction mixture was then allowed to stand until an ester layer and an aqueous layer had formed, and the ester layer was separated from the aqueous layer. The ester was given successive washes with a sodium hydroxide solution and water, and then dehydrated under vacuum at about 110° C., thereby obtaining an excellent yield of n-tetradecoxyethyl cresyl chlorocresyl phosphate.

EXAMPLE XV

*Eicosyl phenyl 2,4-dichlorophenyl phosphate*

In accordance with the procedure described in Example XIV, eicosyl phenyl 2,4-dichlorophenyl phosphate was prepared by reacting 41.5 g. of eicosyl phosphoryl dichloride with 11.6 g. of magnesium phenate and 18.3 g. of magnesium 2,4-dichlorophenate contained in an aqueous medium. An excellent yield of eicosyl phenyl 2,4-dichlorophenyl phosphate was obtained.

EXAMPLE XVI

*Tetracosyl phenyl para-nitrophenyl phosphate*

In accordance with the procedure described in Example XIV, an excellent yield of tetracosyl phenyl para-nitrophenyl phosphate was obtained by reacting 47 g. of tetracosyl phosphoryl dichloride with 11.3 g. of calcium phenate and 15.8 g. of calcium para-nitrophenate contained in an aqueous medium.

EXAMPLE XVII

*Beta-docosoxyethyl phenyl cresyl phosphate*

In accordance with the procedure described in Example XIV, an excellent yield of beta-docosoxyethyl phenyl cresyl phosphate was obtained by reacting 24.4 g. of beta-docosoxyethyl phosphoryl dichloride with an aqueous solution containing 7.0 g. of potassium phenate and 7.7 g. of potassium cresylate.

EXAMPLE XVIII

*Trimethylcyclohexyl para-nitrophenyl chlorocresyl phosphate*

In accordance with the procedure described in Example XIV, an excellent yield of trimethylcyclohexyl para-nitrophenyl chlorocresyl phosphate was obtained by reacting 259 g. of trimethylcyclohexyl phosphoryl dichloride with an aqueous solution containing 186 g. of potassium para-nitrophenate and 189.6 g. of potassium chlorocresylate.

EXAMPLE XIX

*Perfluorobutyl phenyl cresyl phosphate*

In accordance with the procedure described in Example XIV, perfluorobutyl phenyl cresyl phosphate was prepared in an excellent yield by reacting 35.3 g. of perfluorobutyl phosphoryl dichloride with an aqueous solution containing 12.2 g. of sodium phenate and 13.7 g. of sodium cresylate.

EXAMPLE XX

*Beta-phenoxyethyl phenyl cresyl phosphate*

In accordance with the procedure described in Example XIV, an excellent yield of beta-phenoxyethyl phenyl cresyl phosphate was obtained by reacting 255 g. of beta-phenoxyethyl phosphoryl dichloride with an aqueous solution containing 138.6 g. of potassium phenate and 153.3 g. of potassium cresylate.

EXAMPLE XXI

*Methyl phenyl cresyl phosphate*

368.2 g. of $POCl_3$ were cooled with stirring to about 5° C. in a closed glass-lined reaction vessel. 64 g. of methyl alcohol were cooled and added to the $POCl_3$ with continuous stirring and at a rate so as to maintain a reaction temperature of about 0° C. The reaction mixture was agitated and the temperature slowly raised to about 25° C. and maintained at that temperature for one hour following the addition of all the methyl alcohol. The hydrogen chloride gas which was evolved from the reaction was continuously removed by means of applying a reduced pressure to the reaction vessel.

After the removal of the hydrogen chloride was essentially complete, the mass was fractionated keeping the still pot temperature below 110° C. The main fraction, methyl phosphoryl dichloride, was collected in the boiling range of 62–68° C./30 mm. absolute pressure (Hg). A yield of 88.2% on phosphorus oxychloride was obtained.

A solution of sodium arylates was prepared by reacting 98.7 g. of phenol, 113.4 g. of cresol with 173 g. of 48.6% sodium hydroxide dissolved in 300 cc. of water in such a manner and added at such a rate so as to maintain a solution temperature below 25° C. The solution of sodium phenate and sodium cresylate was cooled to 5° C. and then 149 g. of distilled methyl phosphoryl dichloride was added to the solution of the sodium arylates at such a rate so as to maintain a reaction temperature below 5° C. After the addition of the methyl phosphoryl dichloride was complete, the stirring was continued and the temperature allowed to rise to about 25° C. The reaction mixture was then allowed to stand until an ester layer and an aqueous layer formed and the crude ester layer was separated from the aqueous layer by decantation. Purification of the crude ester layer was effected by washing the ester with a dilute sodium hydroxide solution followed by washing with water. The ester was then dehydrated under a reduced pressure and an excellent yield of methyl phenyl cresyl phosphate obtained.

EXAMPLE XII

*2-ethylbutyl phenyl cresyl phosphate*

In a manner similar to that used for the preparation of n-hexyl phenyl cresyl phosphate (Example IV), 2-ethylbutyl phenyl cresyl phosphate was prepared from the following reactants:

| | | |
|---|---|---|
| Phosphorus oxychloride | g | 153.4 |
| 2-ethylbutanol | g | 102.0 |
| Phenol | g | 98.8 |
| Cresol | g | 113.4 |
| Sodium hydroxide | g. (as 47.0%) | 178.7 |
| Water | cc | 280 |

From these charges, 324.6 g. of 2-ethylbutyl phenyl cresyl phosphate were obtained. This represents a yield of 93.4% on phosphorus oxychloride.

The properties of the ester were:

| | | |
|---|---|---|
| Sp. gr. 25°/25° C. | | 1.102 |
| Ref. index 25° C. | | 1.5141 |
| Viscosity at 100° F. | cs | 10.9 |
| Viscosity at 210° F. | cs | 2.5 |

EXAMPLE XXIII

*2-ethylhexyl phenyl chlorophenyl phosphate*

In accordance with the procedure described in Example XIV, 2-ethylhexyl phenyl chlorophenyl phosphate was prepared utilizing the following ingredients:

| | | |
|---|---|---|
| 2-ethylhexanol | g | 130.1 |
| Phosphorus oxychloride | g | 153.4 |
| Phenol | g | 98.7 |
| Chlorophenol | g | 134.9 |
| Potassium hydroxide | g. (as 100%) | 117.8 |
| Water | cc | 300 |

EXAMPLE XXIV

*6-methylheptyl phenyl cresyl phosphate*

In accordance with the procedure described in Example XIV, 6-methylheptyl phenyl cresyl phosphate was prepared utilizing the following ingredients:

| | | |
|---|---|---|
| 6-methylheptanol | g | 130.1 |
| Phosphorus oxychloride | g | 153.4 |
| Phenol | g | 98.7 |
| Cresol | g | 113.4 |
| Potassium hydroxide | g. (as 100%) | 117.8 |
| Water | cc | 300 |

An excellent yield of 6-methylheptyl phenyl cresyl phosphate was obtained.

EXAMPLE XXV

*6-methylheptyl cresyl beta-naphthyl phosphate*

In accordance with the procedure described in Example XIV, 6-methylheptyl cresyl beta-naphthyl phosphate was prepared in good yield from the following starting materials:

| | | |
|---|---|---|
| 6-methylheptanol | g | 65.0 |
| Phosphorus oxychloride | g | 76.7 |
| Cresol | g | 57.2 |
| Beta-naphthol | g | 76.4 |
| Sodium hydroxide | g. (as 48.7%) | 87.0 |
| Water | cc | 300 |

The properties of this phosphate ester were:

| | |
|---|---|
| Sp. gr. 25°/25° C. | 1.1162 |
| Ref. index 25° C. | 1.5588 |

| Analysis | Phosphorus, percent |
|---|---|
| Calculated for $C_{25}H_{31}O_4P$ | 7.26 |
| Found | 6.75 |

EXAMPLE XXVI

*6-methylheptyl cresyl o-nitrophenyl phosphate*

In accordance with the procedure described in Example XIV, 6-methylheptyl cresyl o-nitrophenyl phosphate was prepared in good yield from the following starting materials:

| | | |
|---|---|---|
| 6-methylheptanol | g | 65.0 |
| Phosphorus oxychloride | g | 76.7 |
| Cresol | g | 57.2 |
| o-Nitrophenol | g | 73.6 |
| Sodium hydroxide | g. (as 48.7%) | 87.0 |
| Water | cc | 550 |

The properties of this phosphate ester were:

| | |
|---|---|
| Sp. gr. 25°/25° C. | 1.1678 |
| Ref. index 25° C. | 1.5211 |

| Analysis | Phosphorus, percent | Nitrogen, percent |
|---|---|---|
| Calculated for $C_{21}H_{28}O_6NP$ | 7.36 | 3.33 |
| Found | 6.84 | 3.58 |

In addition to the monoalkyl diaryl phosphate esters prepared in the preceding examples according to the novel process of this invention, the following esters are further illustrations, but not limitative, of esters which may be prepared in accordance with the process of this invention:

Ethyl phenyl cresyl phosphate
n-Butyl phenyl cresyl phosphate
2-methylpentyl phenyl cresyl phosphate
n-Octyl phenyl cresyl phosphate
Nonyl phenyl cresyl phosphate
Trimethylhexyl phenyl cresyl phosphate
Decyl phenyl cresyl phosphate
2-n-propylheptyl phenyl cresyl phosphate
Dodecyl phenyl cresyl phosphate
2-ethylbutoxyethyl phenyl cresyl phosphate
n-Hexoxyethyl phenyl cresyl phosphate
Octoxyethyl phenyl cresyl phosphate
n-Octoxyethyl phenyl cresyl phosphate
Iso-octoxyethyl phenyl cresyl phosphate
Nonoxyethyl phenyl cresyl phosphate
Trimethylhexoxyethyl phenyl cresyl phosphate
Decoxyethyl phenyl cresyl phosphate
Dodecoxyethyl phenyl cresyl phosphate
Methyl o-chlorophenyl bromocresyl phosphate
Ethyl 2,4-dibromophenyl chloronaphthyl phosphate
Propyl p-chlorophenyl o-cresyl phosphate
Butyl 2,4-dichlorophenyl p-ethylphenyl phosphate
Isobutyl cresyl α-naphthyl phosphate Amyl p-nitrophenyl bromonaphthyl phosphate
Isoamyl o-methoxphenyl cresyl phosphate
Allyl pentachlorophenyl β-naphthyl phosphate
Methallyl p-butoxyphenyl m-cresyl phosphate
Nitrobutyl p-fluorophenyl chlorocresyl phosphate
Nitroamyl 2,4,5-trichlorophenyl chloronaphthyl phosphate
β-Hydroxyethyl o-chlorophenyl bromonaphthyl phosphate
β-Chloroethyl 2,4-dichlorophenyl p-cresyl phosphate
Perfluorobutyl phenyl bromocresyl phosphate
Cyclohexyl p-nitrophenyl α-naphthyl phosphate
Cyclopentyl 2,4-dibromophenyl cresyl phosphate
Trimethylcyclohexyl o-cresyl dichloronaphthyl phosphate
β-Phenoxyethyl pentachlorophenyl cresyl phosphate
β-Benzoxyethyl p-nitrophenyl o-iodophenyl phosphate
Benzyl o-methoxyphenyl p-ethylphenyl phosphate
* "Carbitol" p-fluorophenyl p-butoxyphenyl phosphate
Eicosyl β-naphthyl m-cresyl phosphate
Docosyl p-butoxyphenyl chloronaphthyl phosphate
Tetracosyl o-chlorophenyl dichloronaphthyl phosphatee
Methoxyethyl p-nitrophenyl p-butoxyphenyl phosphate
Ethoxyethyl chlorocresyl dichloronaphthyl phosphate
Propoxethyl 2,4,5-trichlorophenyl m-cresyl phosphate
Eicosoxyethyl phenyl p-ethylphenyl phosphate
Tetracosoxyethyl 2,4,5-trichlorophenyl α-naphthyl phosphate
Tridecyl 2,4-dibromophenyl chlorocresyl phosphate
Tetradecyl chloronaphthyl o-iodophenyl phosphate
Tetradecoxyethyl cresyl p-fluorophenyl phosphate
Pentadecyl chlorocresyl pentachlorophenyl phosphate
Pentadecoxyethyl o-methoxyphenyl β-naphthyl phosphate
Hexadecyl p-butoxyphenyl p-nitrophenyl phosphate
Hexadecoxyethyl p-ethylphenyl p-cresyl phosphate
Octadecyl p-fluorophenyl dichloronaphthyl phosphate
Octadecoxyethyl phenyl bromonaphthyl phosphate
Allyl phenyl cresyl phosphate
Methallyl phenyl naphthyl phosphate
Nitrobutyl chlorophenyl phenyl phosphate
β-Hydroxyethyl nitrophenyl cresyl phosphate
β-Chloroethyl isopropylphenyl chloronaphthyl phosphate
Cyclohexyl phenyl cresyl phosphate
β-Benzoxyethyl phenyl cresyl phosphate
* "Carbitol" phenyl cresyl phosphate

* Monoethylether of diethylene glycol.

In the above list of compounds the nonyl and dodecyl radicals may be derived, in addition to the conventional sources, from the polymerization products of olefins, such as propylene or the dodecyl radical may be derived from the polymerization products of olefins, such as butylene. These alkyl radicals may also be derived from branched chain primary alcohols prepared by the polymerization of olefins to form a branched chain olefin, followed by the reaction with carbon monoxide and hydrogen (oxo process) to form a primary branched chain alkyl alcohol. Thus, a nonyl alcohol may be prepared from the polymerization of isobutylene to form an octene which may then be reacted with carbon monoxide and hydrogen to form a branched chain primary nonyl alcohol. Nonaldehyde may be prepared in a similar manner and may then be subjected to an aldol condensation to form a branched chain primary octadecyl alcohol. The alkyl radicals may also be derived from straight chain primary alcohols obtained by the hydrogenation of coconut oil and fats.

In the compounds of the invention, including those disclosed above, the cresyl radical may be ortho-cresyl, para-cresyl or meta-cresyl, for example, 2-ethylhexyl phenyl ortho-cresyl phosphate, 2-ethylhexyl phenyl para-cresyl phosphate, or 2-ethylhexyl phenyl meta-cresyl phosphate. Also, the products of the invention may comprise mixtures of phosphate esters containing ortho, para and/or meta-cresyl radicals.

While specific quantities, temperatures and reaction conditions have been set forth in the preceding examples, it is not intended that the novel process of this invention be restricted solely thereto; these quantities, temperatures and reaction conditions are subject to substantial variation. Thus, in the first step of the reaction, the particular phosphoryl dichloride which is an intermediate in the preparation of the phosphate esters prepared by the novel process of this invention, may be prepared in any convenient manner which yields a substantially pure product. In the case of alkyl phosphoryl dichlorides wherein the alkyl substituent contains from 1 to 5 carbon atoms and alkoxyethyl phosphoryl dichlorides wherein the alkyl substituent contains from 1 to 3 carbon atoms, the alkyl phosphoryl dichloride may be formed by reacting substantially equimolecular proportions of POCl₃ and a primary alkyl alcohol containing from 1 to 5 carbon atoms or a beta-alkoxyethyl alcohol wherein the alkyl substituent contains from 1 to 3 carbon atoms or by reacting, if desired, a considerable excess of the appropriate alcohol with phosphorus oxychloride and subsequently recovering substantially pure alkyl phosphoryl dichloride by fractionation.

In the case of alkyl phosphoryl dichlorides wherein the alkyl substituent is an alkyl radical terminating with a CH₂ group and containing at least 6 and preferably from 6 to 24 carbon atoms or an alkoxyethyl radical wherein the alkyl substituent contains at least 4 and preferably from 4 to 24 carbon atoms, it is necessary that substantially equimolecular proportions of the primary alkyl alcohol or alkoxyethyl alcohol and the POCl₃ be utilized. In my copending application Serial No. 75,093, filed February 7, 1949, it was pointed out that monoalkyl phosphoryl dichlorides tend to decompose with the decomposition being dependent upon the length of the alkyl substituent and upon time and temperature. In the case of the lower alkyl phosphoryl dichlorides, such as the C₁ to C₅ alkyl phosphoryl dichlorides, the boiling points of the compositions are lower than their respective decomposition range over commercially practical subatmospheric pressures, thereby permitting purification of the monoalkyl phosphoryl dichlorides by fractionation. However, the decomposition temperature ranges of the monoalkyl phosphoryl dichlorides which are intermediate to the formation of the monoalkyl diaryl phosphate esters embraced by the preferred embodiment of the novel process of this invention, are lower than their respective boiling points that could be obtained under commercially feasible subatmospheric pressures, thus rendering purification of the intermediate monoalkyl phosphoryl dichlorides by commercial fractionation impossible. Furthermore, if purified intermediate alkyl phosphoryl dichlorides are obtained and subsequently reacted with hydroxy aryl compounds to form monoalkyl diaryl phosphates in much the same manner as triphenyl phosphate or tricresyl phosphate is made, the relatively high temperatures required to cause the reaction to proceed essentially quantitatively are again higher than the decomposition temperature ranges of the respective alkyl phosphoryl dichlorides and consequently decomposition again results.

Typical relationships that exist between the boiling point and the decomposition temperature range of various alkyl phosphoryl dichlorides are shown on the following table wherein:

Column A is the time required for the exothermic decomposition to start when the alkyl phosphoryl dichloride is maintained at 100°–110° C.

Column B is the boiling range when the mass temperature is maintained at 70–80° C., which is a reasonably safe mass temperature in view of the exothermic decomposition characteristics.

is seen that commercial purification of these acid chlorides by fractionation is impossible. Before the boiling points of these materials could be reached, decomposition would have resulted as evidenced by the exothermic decomposition reaction and separation of the decomposition products into two distinct layers. In order to distill these materials, a vacuum higher than that could be obtained with commercially practical equipment would be necessary. Molecular distillation has also proven to be unsatisfactory for the purification of these alkyl phosphoryl dichlorides because of their highly corrosive nature and their tendency to "gas."

Butoxyethyl phosphoryl dichlorides does not decompose in essentially the same manner as do the other derivatives, that is, an exothermic decomposition accompanied with a separation of the decomposition products, but on being subjected to heat, the butoxyethyl phosphoryl dichloride severely discolors, which coloration is evident in the final butoxyethyl diaryl phosphate. Thus, according to the methods heretofore practiced, the elevated temperatures used in the reaction of alkoxyethyl phosphoryl dichlorides with a hydroxy aryl compound would lead to highly colored monoalkoxyethyl diaryl phosphate esters which are not suitable for the applications previously mentioned.

Notwithstanding the foregoing remarks, a slight variation is permissible from the preferred equimolecular proportion of the alcohol and the POCl$_3$ utilized. However, as the molecular pro-

| Compound | Specific Gravity, 25°/25° C. | A | B (mm. Hg absolute) |
|---|---|---|---|
| Methyl phosphoryl dichloride | 1.4890 | None in 24 hours | 62–68°/30 mm. |
| Butyl phosphoryl dichloride | 1.2566 | 1.25–1.5 hours | 66–72°/2.5–3 mm. |
| Isoamyl phosphoryl dichloride | 1.2097 | 45 minutes | 68–73°/0.5–0.8 mm. |
| Butoxyethyl phosphoryl dichloride | 1.2196 | No separation in 13 hrs. Severely blackens in about 1–2 hours. | |
| n-hexyl phosphoryl dichloride | 1.1809 | 40–50 min | Does not distill with mass temp. at 70–80° under 0.8 mm. pressure. |
| Iso-octyl phosphoryl dichloride | 1.1329 | 35–40 min | Do. |
| 2-ethylhexyl phosphoryl dichloride | 1.1320 | 7–9 min | Do. |
| n-octyl phosphoryl dichloride | 1.1248 | | Do. |
| Decyl phosphoryl dichloride | 1.0924 | 40–45 min | Do. |
| Lauryl phosphoryl dichloride | 1.0594 | | Do. |
| Tridecyl phosphoryl dichloride | 1.0613 | 80 min | Do. |
| Tetradecyl phosphoryl dichloride | 1.0556 | 60 min | Do. |
| Octadecyl phosphoryl dichloride | 0.9995 at 31/25° C | | Do. |

It is evident that methyl phosphoryl dichloride may be purified by fractionation inasmuch as no decomposition was found after 24 hours at 100°–110° C. and that its boiling point under 30 mm. vacuum, a commercially feasible pressure, is below its decomposition point. Butyl phosphoryl dichloride and isoamyl phosphoryl dichloride may similarly be fractionated as their boiling points at commercially feasible subatmospheric pressures may be reduced below their respective decomposition temperature ranges. However, it is evident that as the length of the alkyl chain is increased the tendency to decompose is also increased which is substantiated by considering the other mentioned alkyl phosphoryl dichlorides. Thus, it is evident from the extremely short decomposition time of the isoamyl phosphoryl chloride at 100°–110° C. and the high vacuum necessary to reduce its boiling point so that it may be fractionated without decomposition, that a further increase in the length of the alkyl chain would render impossible purification of the alkyl phosphoryl dichloride by distillation. Considering the alkyl phosphoryl dichlorides which are intermediate to the formation of the monoalkyl diaryl phosphates prepared by the novel process of this invention, it portion of the alcohol is increased beyond the preferred one molecular proportion, the formation of dialkyl phosphoryl chloride is promoted affecting the yield and quality of the final product. If the molecular proportion of the alcohol is reduced below the preferred one molecular proportion, the yield of the finished product is reduced due to the presence of unreacted phosphorus oxychloride which must be removed by fractionation to prevent the formation of the triaryl derivative during the subsequent reaction.

Preferably, therefore, the alkyl and alkoxyethyl phosphoryl dichlorides utilized in preparing the alkyl diaryl phosphate esters according to the novel process of this invention are prepared by reacting equimolecular proportions of a primary alkyl alcohol containing from 1 to 24 carbon atoms or beta-alkoxyethyl alcohol wherein the alkyl substituent contains from 1 to 24 carbon atoms and POCl$_3$. The reaction between the alcohol and phosphorus oxychloride is exothermic and is accompanied by a considerable evolution of hydrogen chloride. The rate of addition of the alcohol and the temperature at which the reaction mass is maintained is, therefore, governed by the nature of the equipment, cooling capacity and ability to remove hydrogen chloride as it is formed to prevent too violent a reaction.

The practical temperature range limits of this reaction are governed by the freezing point of $POCl_3$ and the color of finished product desired. Since $POCl_3$ crystallizes at approximately 2° C., initial reaction temperatures below 2° C. are not practical. Once the reaction is begun, the temperature may then be reduced below +2° C. as the alcohol added and the alkyl phosphoryl dichloride formed depress the crystallizing point of the mass so that lower temperatures may be maintained. As the temperature of the reaction is increased greater than 25° C., the color of the monoalkyl phosphoryl dichloride is increased resulting in more highly colored monoalkyl diaryl phosphate esters. Thus, the preferred and practical temperature range of this reaction is from about 2° C. to about 25° C. After the reaction is substantially complete, the temperature may be increased to a maximum of about 50° C. to facilitate the removal of the hydrogen chloride gas evolved in the reaction.

It is also preferred that the alcohol be added to the $POCl_3$. While the reverse order of addition of reactants may be utilized, such a reverse order promotes the formation of the dialkyl phosphoryl chloride and trialkyl phosphate ester thereby affecting the purity of the final product.

The concentration of the alkali metal or alkaline earth metal arylates in the aqueous medium is not critical. Thus, the arylates may be present in complete solution, in suspension, or as a slurry with water. The aqueous medium may be composed of water per se or mixtures of water and ether inert solvents such as, benzene, petroleum ether, naphtha, etc. It is preferred that approximately a one molecular proportion of each of the two dissimilar alkali metal or alkaline earth metal arylates be present for each one molecular proportion of alkyl phosphoryl dichloride. A 5% excess of the arylates can be readily tolerated. If less than one molecular proportion of each of the arylates is utilized, the yield of the final product will be reduced. If greater than a 5% excess is utilized, purification of the final product will be more difficult in that excessive quantities of the arylate will have to be removed from the final product. Any of the alkali metal or alkaline earth metal salts may be utilized, such as, sodium, potassium, lithium, calcium, magnesium, etc.

The temperature of the reaction between the arylate and the monoalkyl phosphoryl dichloride is maintained preferably between 0° and 25° C.; however, the reaction may be carried out from about −10° to about 50° C. If the temperature of the reaction is maintained at the higher level, the color of the final product is somewhat darker than would have resulted if the reaction had been carried out at 0° to 25° C.

In carrying out the reaction between the monoalkyl phosphoryl dichloride and the alkali metal or alkaline earth metal arylates, it is highly preferred that the monoalkyl phosphoryl dichloride be added to the aqueous medium containing the alkaline earth metal or alkali metal arylates in order to obtain a pure monoalkyl diaryl phosphate. Reversing the order of addition of the reactants generally leads to hydrolysis with subsequent low yields of the finished product and the formation of a considerable amount of impurities.

The esters prepared by the novel process of this invention are of such a degree of purity, as heretofore mentioned, that purification by fractionation is unnecessary. Usually all that is required is a simple water and alkali wash followed by dehydration under vacuum. At times, however, it may be necessary to subject some of the more difficultly purified esters to a simple steaming procedure to remove the last traces of the alcohol or other volatiles. This steaming operation can then be followed by dehydration in the normal manner.

This application is a continuation in part of copending application Serial No. 75,098, filed February 7, 1949, now U. S. Patent 2,504,121, issued April 18, 1950, which was a continuation-in-part of application Serial No. 38,194, filed July 12, 1948, now abandoned, which was a continuation-in-part of application Serial No. 720,310, filed January 4, 1947, now abandoned. This application is also a continuation-in-part of copending application Serial No. 23,133, filed April 24, 1948, which is a continuation-in-part of copending application Serial No. 752,830, filed June 5, 1947, now U. S. Patent 2,504,120, issued April 18, 1950. This application is also a continuation-in-part of copending application Serial No. 84,762, filed March 31, 1949, which is a division of copending application Serial No. 376, filed January 2, 1948, now U. S. Patent 2,557,091, issued June 19, 1951. This application is also a continuation-in-part of copending application Serial No. 135,311, filed December 27, 1949, which was a continuation-in-part of copending application Serial No. 75,098, filed February 7, 1949, now U. S. Patent 2,504,121, issued April 18, 1950, which was a continuation-in-part of application Serial No. 38,194, filed July 12, 1948, now abandoned, which was a continuation-in-part of application Serial No. 720,310, filed January 4, 1947, now abandoned.

What is claimed is:

1. In a process for the preparation of esters of ortho-phosphoric acid having the formula

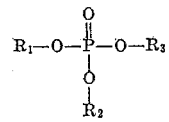

wherein $R_1$ represents an aliphatic radical and $R_2$ and $R_3$ represent dissimilar aryl radicals, the steps comprising reacting in an aqueous medium a one molecular proportion of a phosphoryl dichloride having the formula

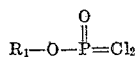

wherein $R_1$ represents an aliphatic radical, with a mixture containing approximately a one molecular proportion of each of two arylates containing dissimilar aryl groups, said arylates being selected from the group consisting of the alkali metal arylates and the alkaline earth metal arylates.

2. The process as described in claim 1 wherein the phosphoryl dichloride is methyl phosphoryl dichloride, and the two dissimilar aryl groups are phenyl and cresyl.

3. The process as described in claim 1 wherein the phosphoryl dichloride is 2-ethylbutyl phosphoryl dichloride, and the two dissimilar aryl groups are phenyl and cresyl.

4. The process as described in claim 1 wherein the phosphoryl dichloride is an octyl phosphoryl dichloride.

5. The process as described in claim 4 wherein the two dissimilar aryl groups are phenyl and cresyl.

6. The process as described in claim 5 wherein the octyl phosphoryl dichloride is 2-ethylhexyl phosphoryl dichloride.

7. The process as described in claim 4 wherein the two dissimilar aryl groups are phenyl and chlorophenyl.

8. The process as described in claim 7 wherein the octyl phosphoryl dichloride is 2-ethylhexyl phosphoryl dichloride.

9. The process as described in claim 1 wherein the phosphoryl dichloride is nonyl phosphoryl dichloride.

10. The process as described in claim 9 wherein the nonyl phosphoryl dichloride is 3,5,5-trimethylhexyl phosphoryl dichloride and the two dissimilar aryl groups are phenyl and cresyl.

11. In a process for the preparation of esters of ortho-phosphoric acid having the formula

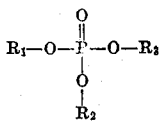

wherein $R_1$ represents an aliphatic radical and $R_2$ and $R_3$ represent dissimilar aryl radicals, the steps comprising reacting a one molecular proportion of $POCl_3$ with approximately a one molecular proportion of a primary aliphatic alcohol while removing the hydrogen chloride formed and thereby forming a substantially pure phosphoryl dichloride having the formula

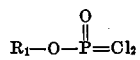

wherein $R_1$ represents an aliphatic radical, reacting in an aqueous medium the phosphoryl dichloride thus formed with a mixture containing approximately a one molecular proportion of each of two arylates containing dissimilar aryl groups, said arylates being selected from the group consisting of the alkali metal arylates and the alkaline earth metal arylates.

12. The process as described in claim 11 wherein the primary aliphatic alcohol is methyl alcohol and the two dissimilar aryl groups are phenyl and cresyl.

13. The process as described in claim 11 wherein the primary aliphatic alcohol is 2-ethyl butanol and the two dissimilar aryl groups are phenyl and cresyl.

14. The process as described in claim 11 wherein the primary aliphatic alcohol is an octyl alcohol.

15. The process as described in claim 14 wherein the two dissimilar aryl groups are phenyl and cresyl.

16. The process as described in claim 15 wherein the octyl alcohol is 2-ethylhexanol.

17. The process as described in claim 14 wherein the two dissimilar aryl groups are phenyl and chlorophenyl.

18. The process as described in claim 17 wherein the octyl alcohol is 2-ethylhexanol.

19. The process as described in claim 11 wherein the primary aliphatic alcohol is a nonyl alcohol.

20. The process as described in claim 9 wherein the nonyl alcohol is 3,5,5-trimethylhexanol and the two dissimilar aryl groups are phenyl and cresyl.

HARRY R. GAMRATH.

References Cited in the file of this patent

UNITED STATES PATENTS

| Number | Name | Date |
|---|---|---|
| 2,005,619 | Graves | June 18, 1935 |
| 2,225,285 | Moyle | Dec. 17, 1940 |
| 2,504,121 | Gamrath | Apr. 18, 1950 |
| 2,520,393 | Fletcher | Aug. 29, 1950 |
| 2,542,604 | Weisel | Feb. 20, 1951 |